United States Patent
Lin et al.

(10) Patent No.: US 8,146,440 B2
(45) Date of Patent: Apr. 3, 2012

(54) STRESS SENSOR AND ASSEMBLY METHOD THEREOF

(75) Inventors: Chun-Hua Lin, Hsin-Chu (TW);
Fumiaki Karasawa, Hsin-Chu (TW);
Chun-Chieh Huang, Hsin-Chu (TW);
Shih-Lang Huang, Hsin-Chu (TW)

(73) Assignee: Elan Microelectronics Corp., Hsin-Chu (TW)

( * ) Notice: Subject to any disclaimer, the term of this patent is extended or adjusted under 35 U.S.C. 154(b) by 169 days.

(21) Appl. No.: 12/509,477

(22) Filed: Jul. 26, 2009

(65) Prior Publication Data
US 2011/0000305 A1  Jan. 6, 2011

(30) Foreign Application Priority Data
Jul. 1, 2009  (TW) .............................. 98122236 A (51) Int. Cl.
*G01L 1/00* (2006.01)
(52) U.S. Cl. ........................................... 73/760
(58) Field of Classification Search ..................... 73/760
See application file for complete search history.

(56) References Cited

U.S. PATENT DOCUMENTS

| | | | | |
|---|---|---|---|---|
| 5,640,178 A * | 6/1997 | Endo et al. | ..................... | 345/161 |
| 6,359,613 B1 * | 3/2002 | Poole | ............................. | 345/161 |
| 6,693,624 B1 * | 2/2004 | Niiyama | ....................... | 345/161 |
| 6,788,291 B2 * | 9/2004 | Burry | ............................. | 345/161 |
| 6,993,982 B2 * | 2/2006 | Karasawa et al. | ......... | 73/862.629 |
| 7,047,826 B2 * | 5/2006 | Peshkin | ..................... | 73/862.53 |
| 7,151,431 B2 * | 12/2006 | Ooba et al. | ........................ | 338/2 |
| 7,176,891 B2 * | 2/2007 | Inukai | ............................ | 345/161 |
| 7,536,922 B2 * | 5/2009 | Sakurai et al. | ........... | 73/862.041 |

* cited by examiner

*Primary Examiner* — Lisa Caputo
*Assistant Examiner* — Octavia Davis-Hollington
(74) *Attorney, Agent, or Firm* — Chun-Ming Shih (57) ABSTRACT

A stress sensor includes a circuit board having a stress sensitive structure, a pointing stick and a metallic back plate. The stress sensitive structure includes a stress deformation region and multiple resistors located on the stress deformation region. The pointing stick is disposed on a top of the circuit board and connected to the stress sensitive structure. The metallic back plate includes at least one fixing material coating region, and thus the fixing edges of the circuit board are fixed on the corresponding fixing material coating region. An assembly method for the stress sensor is also provided.

15 Claims, 7 Drawing Sheets

STRESS SENSOR AND ASSEMBLY METHOD THEREOF

This application is based upon and claims the benefit of priority from the prior Taiwanese Patent Application No. 098122236, filed Jul. 1, 2009, the entire contents of which are incorporated herein by reference.

BACKGROUND

1. Field of the Invention

The present invention relates to a sensor and an assembly method, and more particularly, to a stress sensor fixing to an electronic device and an assembly method thereof.

2. Description of the Related Art

The stress sensor adapted to be used as pointing device is widely used in many types of electronic devices such as laptop, mouse device, keyboard, hand-held device, joystick and the like. For example, the common stress sensor of a laptop is arranged among keys of the keyboard. When a user touches the stress sensor with a finger, the stress sensor senses the magnitude and the direction of the force exerted by the user and then a corresponding movement of cursor is performed.

Figure 1A:
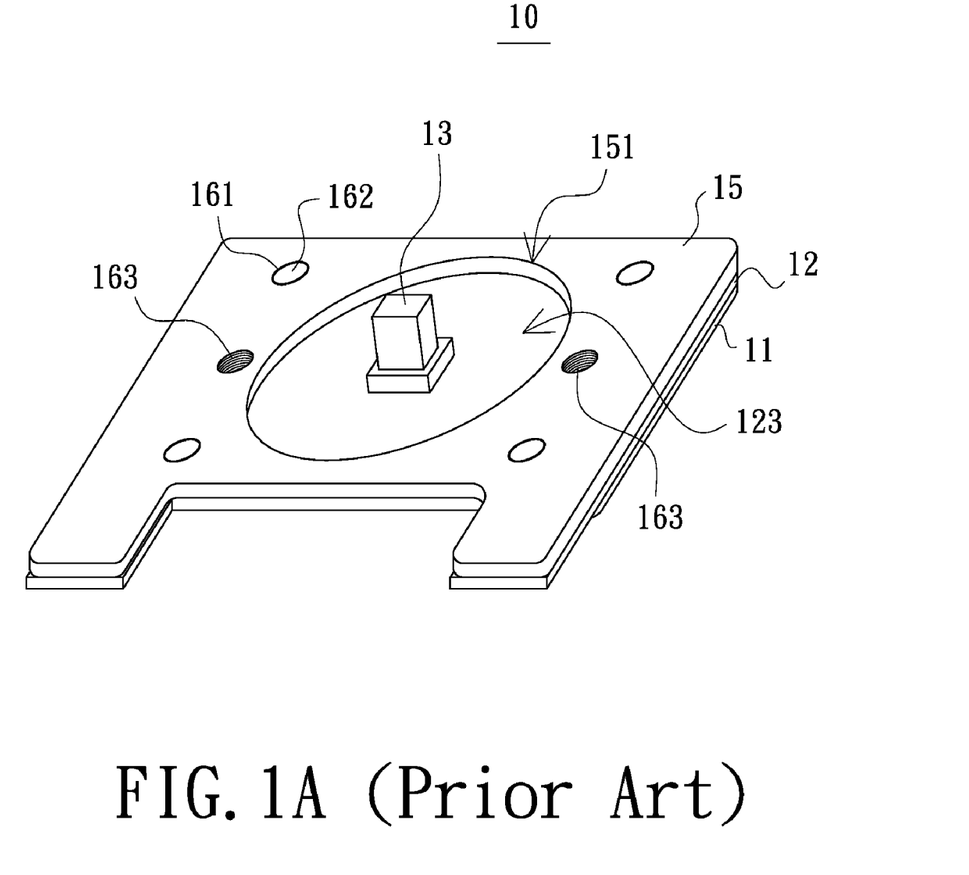
FIG. 1A is a schematic three dimensional view illustrating a conventional stress sensor.
Figure 1B:
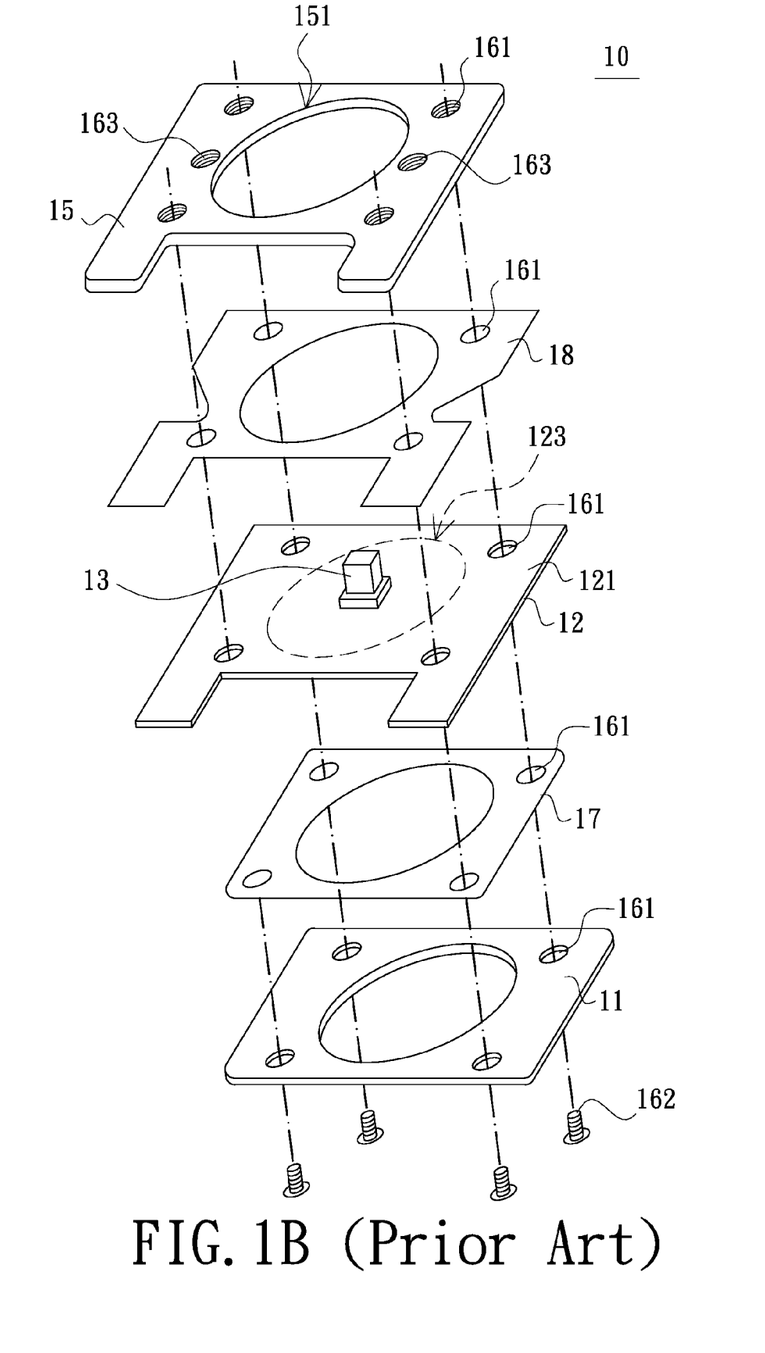
FIG. 1B is a schematic exploded view illustrating the conventional stress sensor.

FIGS. 1A and 1B are schematic three dimensional and exploded views of a conventional stress sensor respectively. A conventional stress sensor 10 includes a metallic back plate 11, a circuit board 12, a pointing stick 13, a fixing element 15 with a hollow portion 151 for penetrating the pointing operation element 13 through, fastening holes 161, screws 162 in accordance with the fastening holes 161, an insulating plate 17 interposed between the back plate 11 and the circuit board 12, an insulating plate 18 interposed between the circuit board 12 and the fixing element 15 and a stress sensitive structure including a stress deformation region and resistors (not shown).

Figure 2:
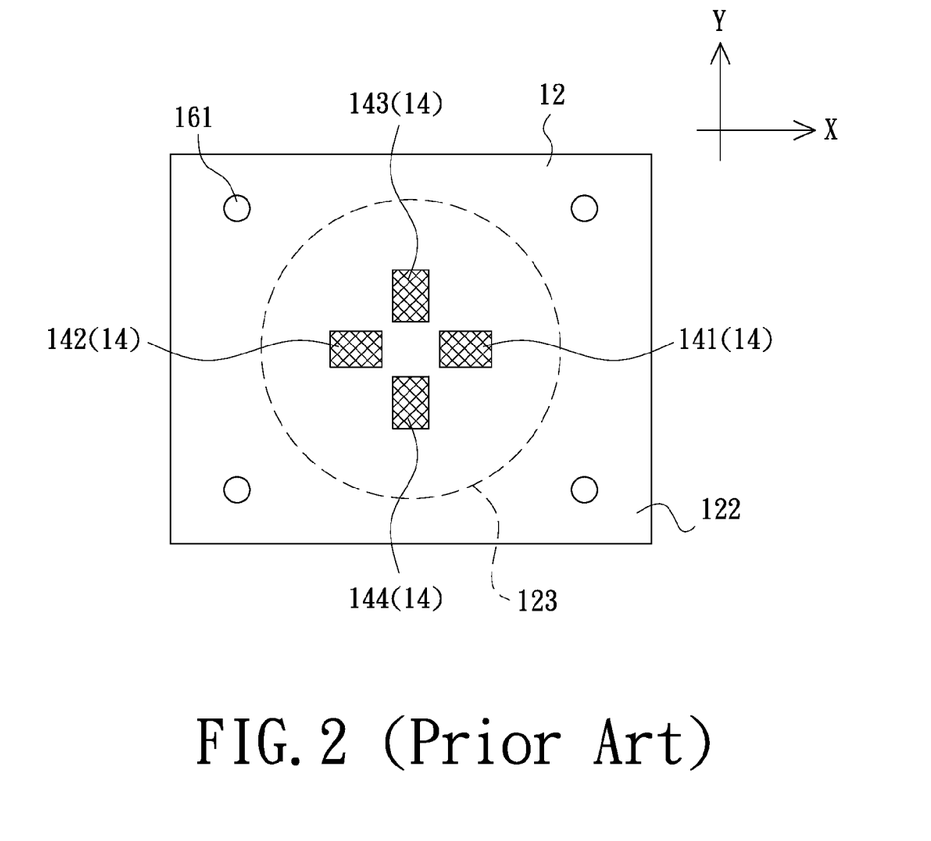
FIG. 2 schematically illustrates a bottom surface of circuit board of the conventional stress sensor.

FIG. 2 schematically illustrates a bottom surface of a circuit board used in conventional stress sensor. As shown in FIGS. 1A, 1B and 2, the pointing stick 13 and the resistors 14 are disposed on a top 121 and a bottom 122 of the circuit board 12 respectively. The resistors 14 include the resistors 141 and 142 for sensing horizontal forces and the resistors 143 and 144 for sensing vertical forces. When the pointing stick 13 is pushed in a desired direction by a finger of the user, a part of the circuit board (i.e. the stress deformation region 123) connected to the bottom of the pointing stick 13 is deformed and thus the resistance values of the stress sensitive resistors 14 is changed. Accordingly, a resistance change is detected by a microprocessor or a controller (not shown) connected to the stress sensor 10, and corresponding movement of the cursor on the display screen is rendered.

Therefore, when the conventional stress sensor is attached onto a structure such as keyboard body of an electronic device by fastening screws through the fastening holes 163 of the fixing element 15, the overall height and the overall weight of the electronic device are increased and thus the electronic device can not achieve advantages of small in size and light weight. In addition, the larger amounts of the elements of the conventional stress sensor reduce the assembly efficiency and increase the cost.

BRIEF SUMMARY

The present invention provides a stress sensor with compact size and low cost.

The present invention further provides an assembly method for raising the assembly efficiency.

In accordance with an aspect of the present invention, there is provided a stress sensor. The stress sensor includes a circuit board having a stress sensitive structure, a pointing stick and a metallic back plate. The stress sensitive structure includes a stress deformation region and a plurality of resistors located on the stress deformation region. The pointing stick is disposed on a top of the circuit board and connected to the stress sensitive structure. The metallic back plate includes at least one fixing material coating region, and the fixing edges of the circuit board are fixed on the corresponding fixing material coating region.

In an embodiment of the present invention, each fixing material coating region of the circuit board has a shrink part with a connecting finger. Material of the connecting finger may include copper foil. The fixing material of the fixing material coating region may include an alloy of tin and copper. In addition, the fixing material coating region has at least one anti-spill hole for restricting a disposing range of the fixing material in the process such as welding. Moreover, the metallic back plate has a plurality of fixing holes, and walls of the fixing holes protrude from the metallic back plate so as to enlarging the contacting area between the fixing element such as a screw and the fixing hole.

In an embodiment, the metallic back plate has a cave in accordance with the stress deformation region of the circuit board.

In accordance with an aspect of the present invention, there is provided an assembly method for stress sensor. The assembly method is applied for applying to a stress sensor including a circuit board, a pointing stick and a metallic back plate having at least one fixing material coating region corresponding to a plurality of fixing edges of the circuit board. The assembly method includes the steps of fixing the pointing stick to a top of the circuit board and fixing the fixing edges of the circuit board to the at least one fixing material coating region of the metallic back plate.

In an embodiment of the present invention, the assembly method further includes the steps of fixing the stress sensor to a structure of an electronic device by a fixing means and fixing a plurality of junction parts of a signal cable to a plurality of junction parts on the top of the circuit board.

The fixing effect and degree of fixing the circuit board to the metallic back plane using fixing material such as solder, silver paste or other heat-solidified materials are increased by forming the fixing material coating region. Therefore, the stress sensor of the present invention has compact size and low cost due to less amounts of elements, and the assembly efficiency is increased due to the step simplification resulted from fixing the circuit board to the metallic back plane.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 3A:
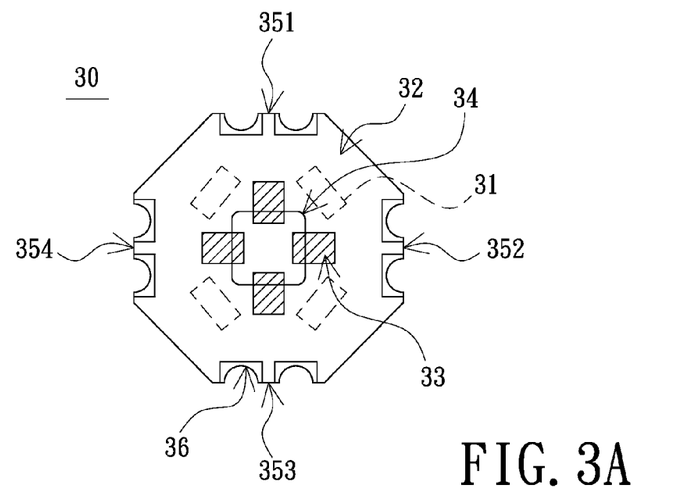
FIG. 3A schematically illustrates an integration of a circuit board and a pointing stick of a stress sensor according to an embodiment of the present invention.

In an embodiment, the stress sensor used as a pointing device of an electronic device includes a circuit board, a pointing stick and a metallic back plate. As shown in FIG. 3A, an octagonal circuit board 30 has a top (not shown), a bottom 32 and a stress sensitive structure. The top of the circuit board 30 has several junction parts 31 for connecting to the corresponding junction parts 521 (illustrated in FIG. 4C) of a signal cable. The stress sensitive structure includes a stress deformation region (not shown) and several resistors 33. It's noted that the octagonal circuit board 30 has larger contacting area than that of circular circuit board or rectangular circuit board. However, the shape of the circuit board 30 is not to be limited by the illustrated embodiments. In addition, the electronic device can be a notebook computer, a mouse, a keyboard, a hand-held device or a joystick that can equip the stress sensor.

Moreover, the pointing stick 34 is disposed on the top of the circuit board 30 and connected to the stress sensitive structure, and more particularly, to the resistors 33. The location of the stress deformation region is located around that of the pointing stick 34. In the embodiment, the circuit board 30 has the fixing edges 351 to 354 and each of the fixing edges 351 to 354 has a shrink part. It's noted that the shrink part is an arc structure resulted from cutting at least one circular through hole formed in the circuit board 30, and the length of the arc structure can be determined by the size of the circuit board 30. For example, the arc structure can be two adjacent and separate semicircles. For applying to smaller-size circuit board 30, the arc structure can be two arcs having a length less than the length of a semicircle.

In addition, the shrink part has a connecting finger 36, and the fixing edges 351 to 354 having the shrink part have larger contacting area for contacting the fixing material such as solder, silver paste or other heat-solidified materials. In other words, the connecting finger 36 enhances the fixing effect between the fixing edges 351 to 354 and the fixing material. Material of the connecting finger 36 can include, but not limited to, copper foil.

Figure 3B:
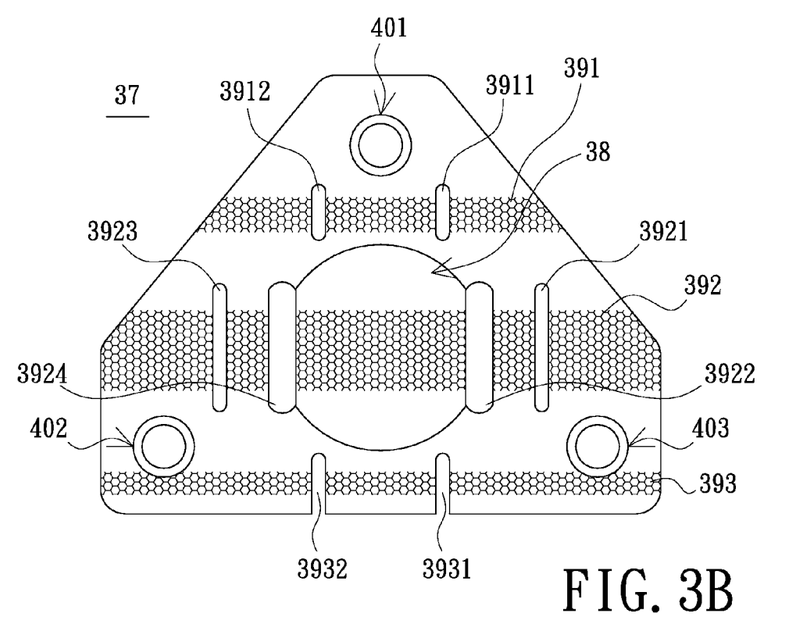
FIG. 3B schematically illustrates a metallic back plane of the stress sensor according to an embodiment of the present invention.

FIG. 3B schematically illustrates a metallic back plane of stress sensor according to an embodiment of the present invention. The position in the metallic back plane 37 corresponding to a stress deformation region can be a cave 38 and thus deformation space of the resistors 33 is increased. In addition, the metallic back plane 37 has at least one fixing material coating region. FIG. 3B illustrates several fixing material coating regions 391 to 393. In another embodiment, fixing material disposed in the cave 38 can be different to the fixing material of the fixing material coating regions 392 due to different process. The fixing material disposed in the fixing material coating regions 391 to 393 includes an alloy of tin and copper or other weldable materials. In general, the circuit board 30 and the metallic back plane are welded by heat-solidified materials or fixed by adhesive. Due to material of the metallic back plane 37 being iron or stainless steel, the metallic back plane 37 can not be firmly fixed to the fixing material. However, the fixing material coating regions 391 to 393 of the metallic back plane 37 can improve fixing effect between the metallic back plane 37, the fixing material and the circuit board 30.

Moreover, the fixing material coating regions 391 to 393 correspond to the fixing edges 351 to 354 of the circuit board 30, so the fixing edges 351 to 354 of the circuit board 30 can be firmly fixed to the fixing material coating regions 391 to 393 of the metallic back plane 37 through the fixing material. In addition, the metallic back plane 37 has at least one anti-spill hole (such as anti-spill holes 3911, 3912, 3921 to 3924, 3931 and 3932) located on the positions of the fixing material coating regions 391 to 393 near the fixing edges 351 to 354 of the circuit board 30 for restricting a disposing range of the fixing material inside the stress deformation region and other expect region.

In an embodiment, the vertical width of the fixing material coating regions 391 to 393 is less than that of the anti-spill holes 3911, 3912, 3921 to 3924, 3931 and 3932 for enhancing the effect of restricting the fixing material. In addition, the horizontal width of the anti-spill holes 3922 and 3924 is larger than that of the anti-spill holes 3921 and 3923 and extended to parts of the cave 38 for protecting the stress sensitive structure.

Furthermore, the metallic back plane 37 has the fixing holes 401 to 403 having thread of screw for fastening screws, and further the stress sensor can be fixed to the structure of an electronic device such as keyboard by screws. The wall of each fixing holes is protruded from the metallic back plane 37 for enlarging the contacting area between the screws and the fixing holes. The fixing holes 401 to 403 can be formed by punching.

Figure 4A:
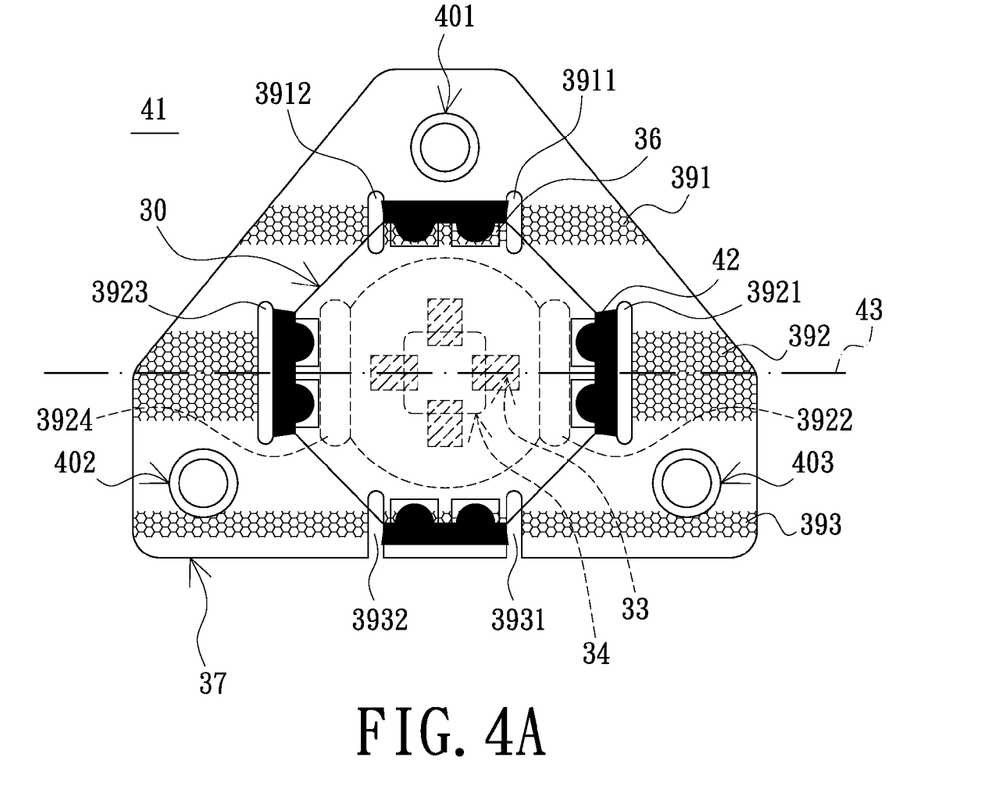
FIG. 4A is a schematic perspective view illustrating an assembled stress sensor according to an embodiment of the present invention.

FIG. 4A is a schematic perspective view illustrating an assembled stress sensor according to an embodiment of the present invention. As shown in FIG. 4A, the circuit board 30 and the metallic back plane 37 of the stress sensor 41 are stacked and fixed by a fixing material 42. The fixing material 42 is attached to each fixing edge and shrink part of the circuit board 30 and attaching range and position of the fixing material 42 are restricted by respective anti-spill holes.

In the mentioned stress sensor 41, through forming the fixing material coating regions 391 to 393 in the metallic back plane 37, the fixing material 42 such as solider enhances the fixing effect during fixing the circuit board 30 and the metallic back plane 37. Therefore, the stress sensor 41 of the present embodiment employs fewer elements and thus has the advantages of compact size and low cost.

Figure 4B:
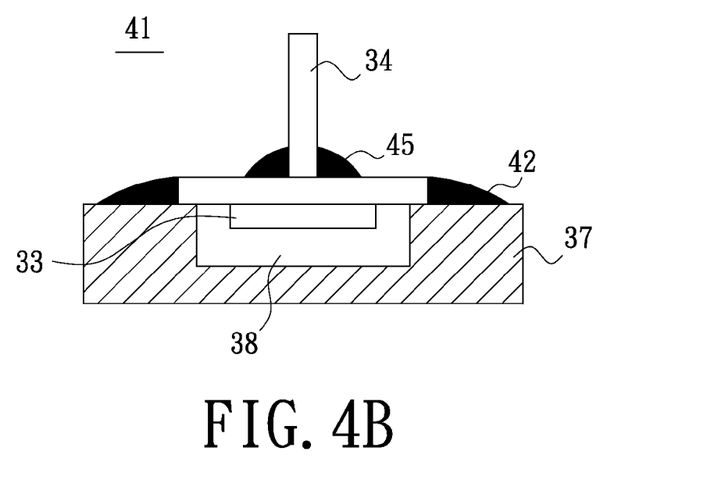
FIG. 4B is a sectional view of an assembled stress sensor of FIG. 4A.

FIG. 4B is a sectional view of an assembled stress sensor shown in FIG. 4A along a line 43. Referring to FIGS. 4A and 4B, the pointing stick 34 is fixed on the top of the circuit board 30 through adhesive 45 and then the circuit board 30 is fixed to the metallic back plane 37 through the fixing material 42 disposed on the fixing material coating regions 391 to 393. Accordingly, enough deformation space for the resistor 33 of the bottom of the circuit board 30 is created in the cave 38.

Figure 4C:
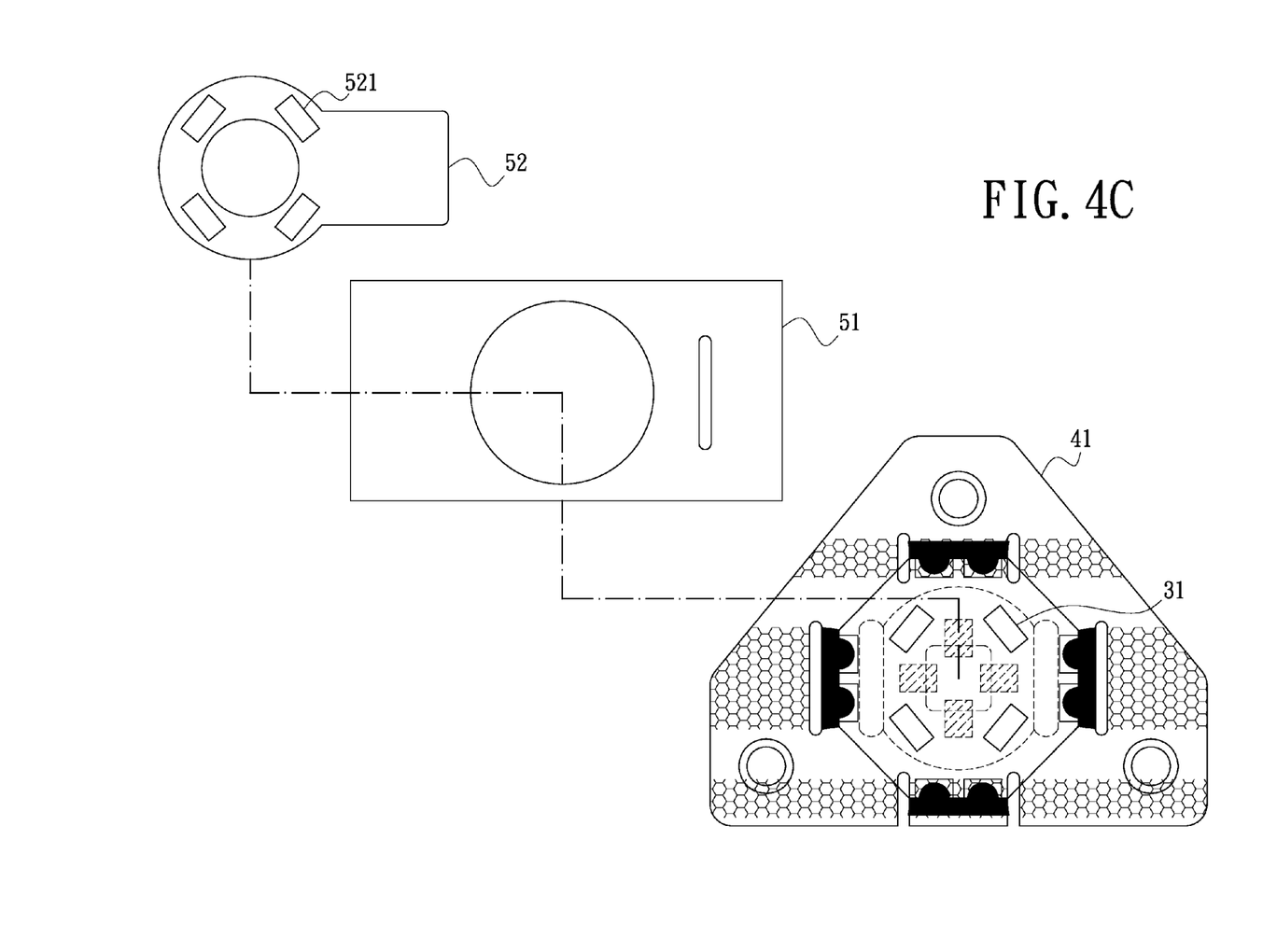
FIG. 4C schematically illustrates an assembled stress sensor of FIG. 4A fixed to a structure of an electronic device.

FIG. 4C schematically illustrates an assembled stress sensor of FIG. 4A fixed to a structure of an electronic device. Referring to FIGS. 4A to 4C, the circuit board 30 and the metallic back plane 37 of the stress sensor 41 are stacked and fixed through the fixing material 42 and then fixed to the structure 51 of an electronic device through fastening the screws to the fixing holes 401 to 403. In addition, the junction parts 521 of the signal cable 52 are connected to the corresponding junction parts 31 on the top of the circuit board 30. Another terminal of the signal cable 52 for being connected to a logic board of a microprocessor or a controller is bent into a preset hole of the structure 51. It's noted that the position of the preset hole is exemplary, and the bending direction of the terminal is adjustable in responsive to the position of the preset hole.

Referring to FIGS. 3A, 3B and 4A, an embodiment of an assembly method for a stress sensor applied to the mentioned stress sensor 41 includes the steps of fixing the pointing stick 34 to a top of the circuit board 30 and fixing the fixing edges 351 to 354 of the circuit board 30 to the fixing material coating regions 391 to 393 of the metallic back plate 37. Therefore, the metallic back plate 37 is fixed to a bottom 32 of the circuit board 30 partially through the fixing edges 351 to 354.

The step of fixing the fixing edges 351 to 354 of the circuit board 30 to the fixing material coating regions 391 to 393 of the metallic back plate 37 uses the fixing material 42 such as solder.

In addition, as shown in FIG. 4C, the mentioned assembly method further includes the steps of fixing the stress sensor 41 to a structure 51 of an electronic device by a fixing means such as screwing means and fixing the junction parts 521 of a signal cable 52 to the junction parts 31 on the top of the circuit board 30.

Figure 5A:
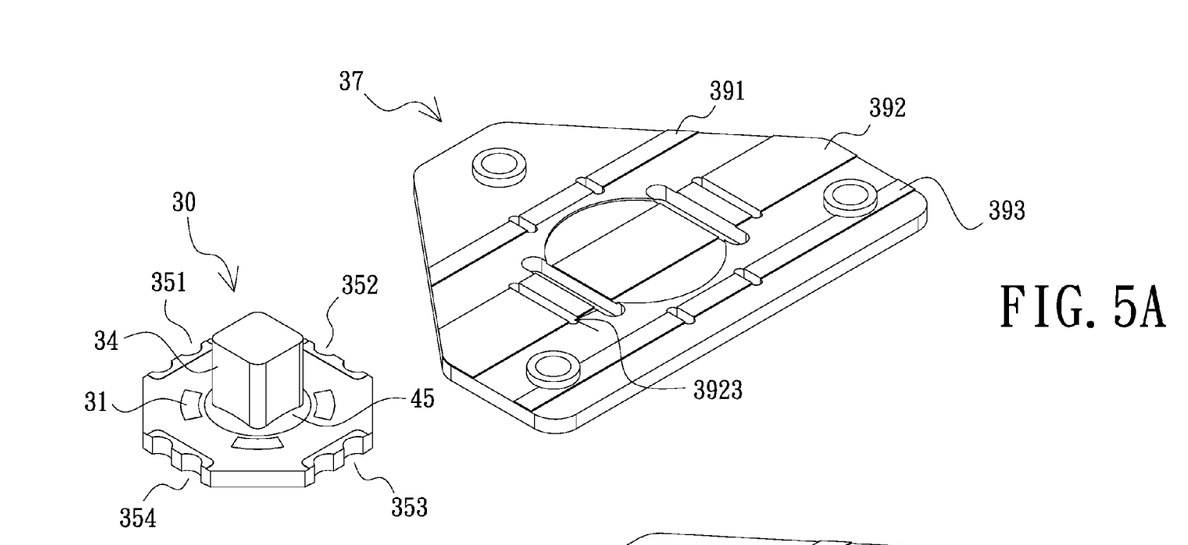
FIG. 5A is a schematic three dimensional view illustrating essential elements of a stress sensor according to an embodiment of the present invention.
Figure 5B:
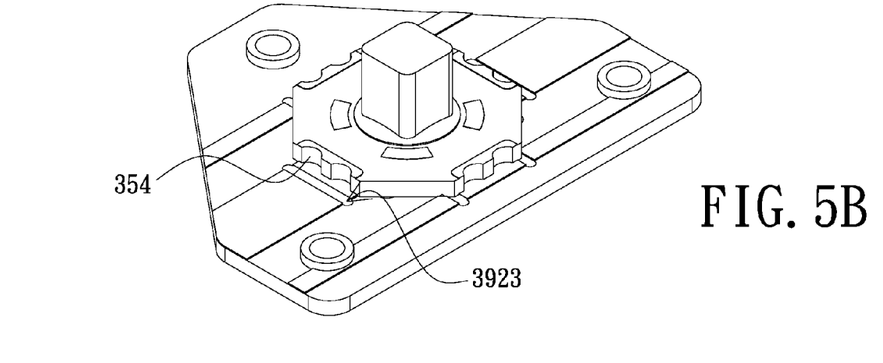
FIG. 5B is a schematic three dimensional view illustrating an assembled part of a stress sensor according to an embodiment of the present invention.

FIG. 5A is a schematic three dimensional view illustrating essential elements of a stress sensor according to an embodiment of the present invention. FIG. 5B is a schematic three dimensional view illustrating an assembled part of a stress sensor according to an embodiment of the present invention. As shown in FIG. 5A, the pointing stick 34 is fixed to the circuit board 30 by the adhesive 45, the junction parts 31 will be connected to corresponding junction parts 521 of the signal cable 52 (as shown in FIG. 4C) and the fixing edges 351 to 354 will be fixed to the fixing material coating regions 391 to 393 of the metallic back plane 37 during assembly. The related location of the stacked circuit board 30 and metallic back plate 37 is shown in FIG. 5B. Parts of the fixing material 42 such as solder are exposed in the area between the fixing edge 354 and the anti-spill hole 3923 during fixing the circuit board 30 to the metallic back plate 37. The distribution of the fixing material 42 in other areas between other fixing edges and anti-spill holes is similar to abovementioned distribution, and detail description is omitted.

In contrast to the conventional technique, the assembly method for the stress sensor fixes the circuit board 30 to the metallic back plate 37 directly, so the steps of assembly are reduced and assembly efficiency is improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A stress sensor, comprising:
   a circuit board having a stress sensitive structure which includes a stress deformation region and a plurality of resistors located on the stress deformation region;
   a pointing stick disposed on a top of the circuit board and connected to the stress sensitive structure;
   a metallic back plate including at least one fixing material coating region, and a first fixing material being disposed in the at least one fixing material coating region; and
   a second fixing material, wherein a plurality of fixing edges of the circuit board being is fixed on the at least one fixing material coating region by the second fixing material, and the second fixing material is connected to the first fixing material.

2. The stress sensor of claim 1, wherein the circuit board is octagonal.

3. The stress sensor of claim 1, wherein each fixing edge has a shrink part.

4. The stress sensor of claim 3, wherein the shrink part has a connecting finger, and material of the connecting finger includes copper foil.

5. The stress sensor of claim 1, wherein the first fixing material of the fixing material coating region includes an alloy of tin and copper.

6. The stress sensor of claim 1, wherein at least one anti-spill hole is set in the at least one fixing material coating region of the metallic back plate.

7. The stress sensor of claim 1, wherein the metallic back plate has a plurality of fixing holes and walls of the fixing holes protrude from the metallic back plate.

8. The stress sensor of claim 1, wherein the top of the circuit board further comprising a plurality of junction parts disposed on the top of the circuit board for fixing to corresponding junction parts of a signal cable.

9. The stress sensor of claim 1, wherein the metallic back plate has a cave in accordance with the stress deformation region of the circuit board.

10. A stress sensor, comprising:
    a circuit board having a stress sensitive structure which includes a stress deformation region and a plurality of resistors located on the stress deformation region;
    a pointing stick disposed on a top of the circuit board and connected to the stress sensitive structure; and
    a metallic back plate including at least one fixing material coating region, and a plurality of fixing edges of the circuit board being fixed on the at least one fixing material coating region, at least one anti-spill hole being set in the at least one fixing material coating region of the metallic back plate.

11. A stress sensor, comprising:
    a circuit board having a stress sensitive structure which includes a stress deformation region and a plurality of resistors located on the stress deformation region, the top of the circuit board further comprising a plurality of junction parts disposed on the top of the circuit board for fixing to corresponding junction parts of a signal cable;
    a pointing stick disposed on a top of the circuit board and connected to the stress sensitive structure; and
    a metallic back plate including at least one fixing material coating region, and a plurality of fixing edges of the circuit board being fixed on the at least one fixing material coating region.

12. An assembly method for stress sensor for applying to a stress sensor, the stress sensor including a circuit board, a pointing stick and a metallic back plate having at least one fixing material coating region corresponding to a plurality of fixing edges of the circuit board, and the assembly method comprising:
- fixing the pointing stick to a top of the circuit board;
- fixing the fixing edges of the circuit board to the at least one fixing material coating region of the metallic back plate;
- fixing the stress sensor to a structure of an electronic device by a fixing means; and
- fixing a plurality of junction parts of a signal cable to a plurality of junction parts on the top of the circuit board.

13. The assembly method of claim 12, wherein the fixing means is screwing means.

14. An assembly method for stress sensor for applying to a stress sensor, the stress sensor including a circuit board, a pointing stick and a metallic back plate having at least one fixing material coating region corresponding to a plurality of fixing edges of the circuit board, a first fixing material being disposed in the at least one fixing material coating region, and the assembly method comprising:
- fixing the pointing stick to a top of the circuit board;
- fixing the fixing edges of the circuit board to the at least one fixing material coating region of the metallic back plate by a second fixing material, and the second fixing material is connected to the first fixing material;
- fixing the stress sensor to a structure of an electronic device by a fixing means; and
- fixing a plurality of junction parts of a signal cable to a plurality of junction parts on the top of the circuit board.

15. The assembly method of claim 14, wherein the fixing means is screwing means.

* * * * *